United States Patent Office 3,632,816
Patented Jan. 4, 1972

3,632,816
6-CHLOROIMIDAZO[2,1-b]THIAZOLE AND ITS 5-SUBSTITUTED DERIVATIVES
John P. Paolini, Flourtown, and Louis J. Lendvay, Philadelphia, Pa., assignors to Richardson-Merrell Inc., New York, N.Y.
No Drawing. Filed Feb. 3, 1969, Ser. No. 796,217
Int. Cl. C07d 99/06
U.S. Cl. 260—306.7                3 Claims

ABSTRACT OF THE DISCLOSURE

Novel 6-chloroimidazo[2,1-b]thiazole and its 5-substituted derivatives have useful anti-inflammatory properties. 6-chloroimidazo[2,1-b]thiazole is prepared by the reaction of phosphorous oxychloride on the known 2-imino-3-thiazolinacetic acid. The 5-substituted derivatives are prepared from this compound by a variety of processes illustrated in the specific examples.

---

This invention relates to new compounds having useful pharmacological properties. This invention also provides methods for the preparation of such compounds.

The useful compounds of this invention are 6-chloroimidazo[2,1-b]thiazole and its 5-substituted derivatives. Thus the compounds of this invention are selected from the group consisting of compounds of the formula:

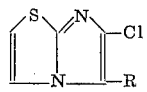

wherein R may be selected from the group consisting of hydrogen chlorine, bromine, cyano, carboxamido, and hydroxymethyl. R may also be an amino-methyl group of the formula —CH₂A in which A is a monocyclic nitrogen containing heterocyclic group such as morpholino, pyrrolidino, and piperidino. R may be a carboxaldehyde derivative of the formula —CH=NOX in which X may be methyl or propynyl, or a carboxaldehyde derivative of the formula —CH=N—Y in which Y may be amino or isopropylidineimino.

The novel compound, 6-chloroimidazo[2,1-b]thiazole, may be prepared by the reaction of phosphorous oxychloride on the known 2-imino-3-thiazolinacetic acid.

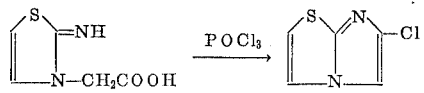

6-chloroimidazo[2,1-b]thiazoles with certain substituents at the 5-position may be prepared by electrophilic substitution, e.g. chlorination, bromination, thiocyanation, or formylation of the 5-unsubstituted-6-chloroimidazo[2,1-b]thiazoles. The preferred procedure for chlorination or bromination involves treatment of the 6-chloroimidazo[2,1-b]thiazole with N-chloro- or N-bromosuccinimide which gives, respectively, the 5,6-dichloro- (Example 2) and the 5-bromo-6-chloroimidazo[2,1-b]thiazole (Example 3) derivatives. The preferred procedure for formylation involves treatment of 6-chloroimidazo[2,1-b]thiazole with phosphorous oxychloride and N,N-dimethylformamide. The resulting 5-formyl derivative (Example 4) may also be converted to the corresponding oxime (Example 5), the O-methyl oxime (Example 6), the O-propynyl oxime (Example 7), and the hydrazone (Example 8). The hydrazone may also be converted to azines, as for example, by reacting with acetone to give the isopropylidine azine (Example 9). Furthermore, the oxime may be dehydrated to the corresponding nitrile, as for example, on treatment of the oxime with thionyl chloride to give the 6-chloro-5-cyanoimidazo[2,1-b]thiazole (Example 10). Treatment of the cyano derivative with concentrated sulfuric acid affords the 5-carbamoyl derivative (Example 11). The 5-formyl group may also be reduced with lithium aluminum hydride to the 5-hydroxymethyl derivative (Example 12).

The 6-chloroimidazo[2,1-b]thiazole readily forms Mannich bases by reaction with formaldehyde and a secondary amine. For example, reaction with formaldehyde and morpholine gives the corresponding 6-chloro-5-morpholinomethylimidazo[2,1-b]thiazole (Example 13). In like manner, the corresponding 5-piperidinomethyl (Example 14) and 5-pyrrolidinomethyl (Example 15) derivatives are prepared.

Where applicable, the acid addition salts of the products of this invention may readily be prepared by the addition of mineral acid or organic acids to the amine in a suitable solvent such as ethanol, acetone, butanone, ether, and the like.

The novel compounds of this invention have useful anti-inflammatory activity as demonstrated by the well-known Carrageenin-Induced Abscess technique in rats. Some of the compounds such as that of Example 1 also have a low degree of analgesic activity.

EXAMPLE 1

6-chloroimidazo[2,1-b]thiazole

A mixture of 2-imino-3-thiazolinacetic acid (40 g.) and phosphorous oxychloride (250 ml.) was heated under reflux for two hours, during which time solution occurred. The excess phosphorous oxychloride was removed by evaporation in vacuo leaving a dark syrupy residue. This residue was poured into an ice-water mixture, stirred, and made basic with sodium hydroxide solution. The resulting solid was filtered off, washed with water, and dried. The residue crystallized from hexane to give 34.7 g. of the desired 6-chloroimidazo[2,1-b]thiazole as white needles, melting point 84 to 86° C.

EXAMPLE 2

5,6-dichloroimidazo[2,1-b]thiazole

A mixture containing 6-chloroimidazo[2,1-b]thiazole (10 g.), N-chlorosuccinimide (11 g.), and chloroform (200 ml.) was heated on a steam bath for five minutes, then stirred at room temperature for twenty minutes. The mixture was then stirred for ten minutes with 20 percent sodium carbonate solution (100 ml.). The organic layer was separated and dried over anhydrous sodium sulfate, and the solvent removed by evaporation. The residue, dissolved in ether, was percolated through a column of acid-washed alumina (30 g.). The solvent was removed from the effluent liquid by evaporation and the residue crystallized from cyclohexane to give 10.1 g. of the desired 5,6-dichloroimidazo[2,1-b]thiazole, melting point 112 to 113° C.

EXAMPLE 3

5-bromo-6-chloroimidazo[2,1-b]thiazole

When N-chlorosuccinimide was replaced with N-bromosuccinimide in the procedure of Example 2, the desired 5-bromo-6-chloroimidazo[2,1-b]thiazole was obtained, melting point 133 to 135° C.

EXAMPLE 4

6-chloro-5-formylimidazo[2,1-b]thiazole

Phosphorous oxychloride (15.5 g.) was added to a cooled mixture of N,N-dimethylformamide (7.5 g.) in chloroform (150 ml). Then 6 - chloroimidazo[2,1-b]-thiazole (16 g.) was added cautiously to the dimethylformamide-POCl$_3$ complex. After addition was complete, the reaction mixture was refluxed for two hours. The solvent was removed by evaporation in vacuo, and the residue poured into ice and water with the separation of a solid. The solid was collected, dried, and crystallized from ethanol to give the desired 6-chloro-5-formylimidazo[2,1-b]thiazole (10.6 g.) as a white solid, melting point 140 to 141.5° C.

EXAMPLE 5

6-chloroimidazo[2,1-b]thiazole-5-aldoxime

Hydroxylamine hydrochloride (3.5 g.) in water (25 ml.) was added to a boiling solution of 6-chloroimidazo-[2,1-b]thiazole-5-carboxaldehyde (9.3 g.) in ethanol (150 ml.). The reaction mixture was boiled for fifteen minutes, then cooled with the separation of a solid. The solid was removed and crystallized from toluene to give the desired 6 - chloroimidazo[2,1 - b]thiazole-5-aldoxime as a white solid, melting point 202 to 203° C.

EXAMPLE 6

6-chloroimidazo[2,1-b]thiazole-5-aldoxime-O-methyl ether

Sodium (2.3 g.) was added to methanol (200 ml.) and after all of the sodium had been consumed, 6-chloroimidazo[2,1-b]thiazole-5-aldoxime (20.2 g.) was added. After standing a short time, methyl iodide (14.2 g.) was added to the reaction mixture and heated under reflux for two hours. The solvent was removed by evaporation in vacuo, and the residue was triturated with hot isopropanol and filtered. The filtrate was diluted with water, with the separation of a solid which was collected, dried, and crystallized from aqueous-ethanol to give 6-chloroimidazo[2,1-b]thiazole - 5 - aldoxime-O-methyl ether (4.0 g.), melting point 130 to 134° C.

EXAMPLE 7

6-chloroimidazo[2,1-b]thiazole-5-aldoxime-O-(2-propynyl) ether

When methyl iodide was replaced with propargyl bromide in the procedure of Example 6, the desired 6-chloroimidazo[2,1-b]thiazole - 5 - aldoxime - O - (2 - propynyl) ether was obtained, melting point 137 to 138° C.

EXAMPLE 8

6-chloroimidazo[2,1-b]thiazole-5-carboxaldehyde hydrazone

6 - chloroimidazo[2,1 - b]thiazole - 5-carboxaldehyde (18.7 g.) was added to a refluxing solution of 95 percent hydrazine (16 g.) in ethanol (300 ml.). The mixture was heated for three hours, and then cooled until a solid separated. The solid was removed and crystallized from benzene to give the desired 6-chloroimidazo[2,1-b]-thiazole - 5-carboxaldehyde hydrazone as a pale yellow solid (2.1 g.), melting point 125.5 to 126.5° C.

EXAMPLE 9

6-chloro-5-isopropylidineazinomethylimidazo-[2,1-b]thiazole

6 - chloroimidazo[2,1-b]thiazole-5-carboxaldehyde hydrazone (8 g.) was added to acetone (150 ml.) and the mixture heated on the steam bath until most of the solvent had evaporated. On cooling, the residue solidified and was recrystallized from heptane to give 8.0 g. of 6-chloro-5 - isopropylidineazinomethylimidazo[2,1 - b]thiazole as yellow crystals, melting point 144 to 146° C.

EXAMPLE 10

6-chloro-5-cyanomidazo[2,1-b]thiazole 6-chloroimidazo[2,1-b]thiazole-5-aldoxime (10 g.) was added in small portions to thionyl chloride (60 ml.). The reaction was exothermic and after the addition of the aldoxime had been completed, the reaction mixture was heated under reflux until complete solution was effected. The solvent was then removed by evaporation in vacuo. The resulting residue was poured onto ice and solidified, the solid was separated and washed with water and dried. The solid crystallized from benzene to give the desired 6-chloro-5-cyanoimidazo[2,1-b]-thiazole (8.2 g.), melting point 174.5 to 176° C.

EXAMPE 11

5-carbamoyl-6-chloroimidazo[2,1-b]thiazole 6-chloro-5-cyanoimidazo[2,1-b]thiazole (25.5 g.) was added with stirring in small portions to cold (10° C.) concentrated sulfuric acid (100 ml.). After the addition was completed the reaction mixture was refrigerated for sixteen hours and then poured onto ice with the separation of a white solid. The solid was filtered off, washed with water, dried and crystallized from isopropanol to give 14 g. of the desired 5-carbamoyl-6-chloroimidazo-[2,1-b]thiazole, melting point 166.5 to 168.5° C.

EXAMPLE 12

6-chloro-5-hydroxymethylimidazo[2,1-b]thiazole

Lithium aluminum hydride (2.9 g.) was added to tetrahydrofuran (200 ml.). The hydride suspension was stirred and 6-chloroimidazo[2,1-b]-5-carboxaldehyde (9.3 g.) was added. The reaction mixture was heated under reflux for fifteen minutes and then allowed to cool to room temperature. The reaction mixture was then decomposed by the cautious addition of a 10 percent hydrochloric acid solution (40 ml.) and filtered. The solvent was evaporated in vacuo and the resulting residue crystallized from toluene to give the desired 6-chloro-5-hydroxymethylimidazo[2,1-b]thiazole (4.4 g.) as a white solid, melting point 225 to 235° C. with decomposition.

EXAMPLE 13

6-chloro-5-morpholinomethylimidazo[2,1-b]thiazole

A mixture of 6-chloroimidazo[2,1-b]thiazole (16 g.), morpholine (8.7 g.), 37 percent formaldehyde solution (8.1 g.), acetic acid (20 ml.), and methanol (125 ml.) was heated under reflux for six hours. The solvent was then removed by evaporation in vacuo, the residue poured into water, made basic with sodium hydroxide solution, and extracted with methylene chloride. The methylene chloride solution was dried over anhydrous sodium sulfate. The solvent was removed and the residue crystallized from hexane to give 19 g. of the desired 6-chloro-5 - morpholinomethylimidazo[2,1 - b]thiazole as a white solid, melting point 126 to 128° C.

EXAMPLE 14

6-chloro-5-piperidinomethylimidazo[2,1-b]thiazole

When morpholine was replaced with piperidine in the procedure of Example 13, the desired 6-chloro-5-piperidinomethylimidazo[2,1-b]thiazole hydrochloride was obtained as a white solid, melting point 212 to 213.5° C.

EXAMPLE 15

6-chloro-5-pyrrolidinomethylimidazo-[2,1-b]thiazole

When morpholine was replaced with pyrrolidine in the procedure of Example 13, the desired 6-chloro-5-pyrrolidinomethylimidazo[2,1 - b]thiazole was obtained as a white solid, melting point 122.5 to 124.5° C.

What is claimed is:

1. 6-chloroimidazo[2,1-b]thiazoles having the formula:

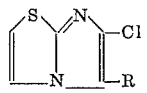

in which R is of the group consisting of hydrogen, chlorine, bromine, cyano, carboxamido, hydroxymethyl, morpholinomethyl, pyrrolidinomethyl, piperidinomethyl, and a carboxaldehyde of the formula —CH=NOX in which X is methyl or propynyl or of the formula —CH=N—Y in which Y is amino or isopropylidineimino, and nontoxic acid addition salts thereof.

2. 6-chloroimidazo[2,1-b]thiazole.

3. A method of making 6-chloroimidazo[2,1-b]thiazole which comprises heating 2-imino-3-thiazolinacetic acid with phosphorous oxychloride.

References Cited

UNITED STATES PATENTS 2,790,172   4/1957   Rudner _____ 260—306.8

ALEX MAZEL, Primary Examiner

R. J. GALLAGHER, Assistant Examiner

U.S. Cl. X.R.

260—247.1, 293.4 E, 999